Feb. 4, 1958   P. W. SMITH   2,822,213
HOUSE TRAILER WITH BOAT CARRYING RECESS IN ROOF
Filed April 27, 1956   3 Sheets-Sheet 1

INVENTOR.
PAUL W. SMITH

Feb. 4, 1958 P. W. SMITH 2,822,213
HOUSE TRAILER WITH BOAT CARRYING RECESS IN ROOF
Filed April 27, 1956 3 Sheets-Sheet 2

INVENTOR.
PAUL W. SMITH
BY
McMorrow, Berman & Davidson
ATTORNEYS

Feb. 4, 1958 — P. W. SMITH — 2,822,213
HOUSE TRAILER WITH BOAT CARRYING RECESS IN ROOF
Filed April 27, 1956 — 3 Sheets-Sheet 3
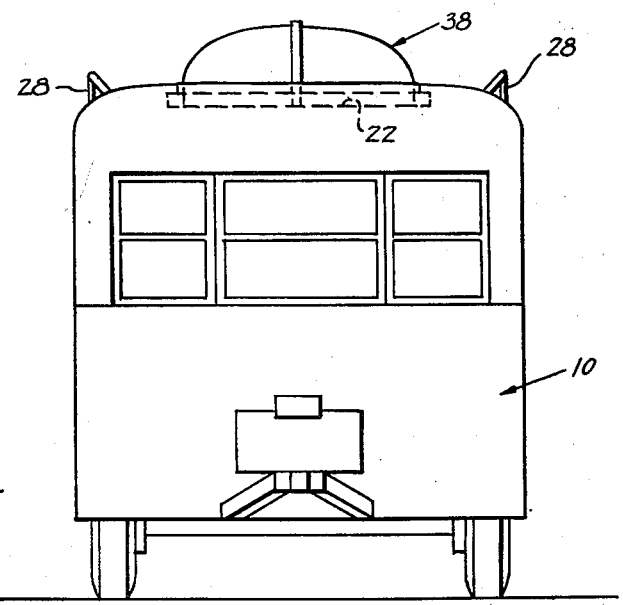
FIG. 5
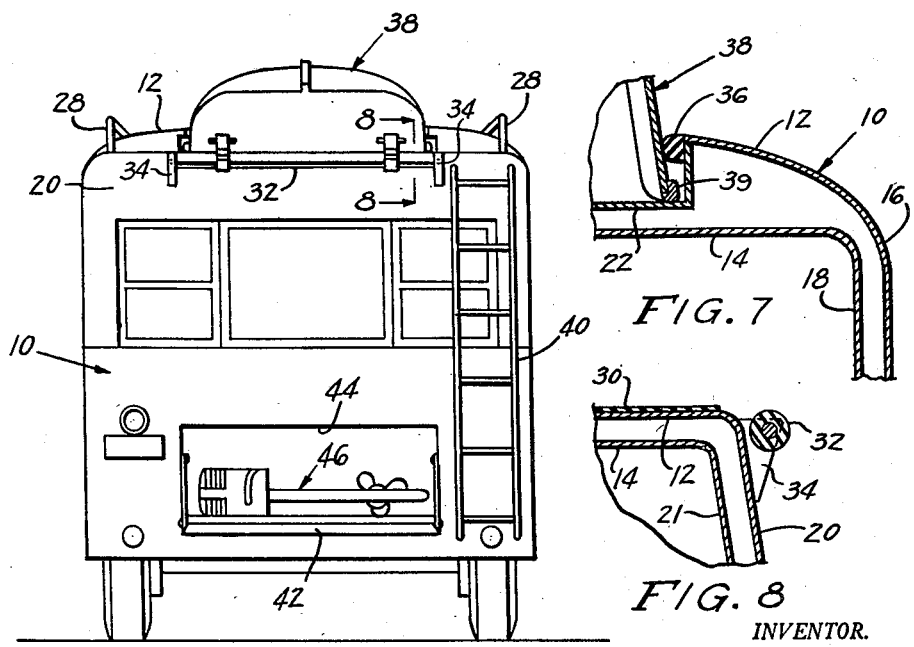
FIG. 6
FIG. 7
FIG. 8
INVENTOR.
PAUL W. SMITH
BY
McMorrow, Berman + Davidson
ATTORNEYS United States Patent Office 2,822,213
Patented Feb. 4, 1958

2,822,213
HOUSE TRAILER WITH BOAT CARRYING RECESS IN ROOF

Paul W. Smith, Quarryville, Pa.

Application April 27, 1956, Serial No. 581,157

2 Claims. (Cl. 296—23)

In many instances, it is desirable to provide means for transporting boats behind automobiles, and boat trailers are, of course, well known for this purpose. At the same time, one may desire to haul a house trailer and the present invention, accordingly, is intended to provide a trailer structure having the characteristic of serving as a house trailer, with the roof portion of said structure being particularly designed to receive a boat, in a manner to facilitate transportation of the boat without injury either to the boat or to the house trailer structure.

The main object of the present invention is to provide a combination house trailer and boat trailer which is particularly designed for use in the manner indicated above. To this end, the tractable structure constituting the present invention includes a house trailer body, the roof of which is formed, at the forward end of the body, with a forwardly tapering depression adapted to receive the bow of a boat. The depression opens at its rear end into a widened recess extending fully to the opposite sides of the roof structure, and at opposite sides of the recess guard rails are provided. Roller means is mounted upon the rear wall of the trailer, facilitating movement of the supported boat into and out of a position in which it will be gripped by overhangs provided upon the opposed walls of the forwardly tapering recess. In addition, the trailer structure has a separate compartment for an outboard motor, and is also equipped with ladder means providing ready access to the boat when the same is to be removed, or is being positioned upon the trailer roof. In this way, the entire device is adapted for use as a house trailer without interference from the boat support means thereof, while at the same time providing a highly efficient supporting structure for the boat, designed to hold the boat in place without injury either to the boat or to the trailer body.

Among more important objects of the invention are the following:

To provide a trailer structure as stated which can be manufactured at little increase in cost above that required for a conventional house trailer not adapted for the transportation of a boat;

To facilitate the engagement of the boat in the roof of the trailer, with minimum difficulty, the construction even permitting the boat to be positioned upon the trailer or removed by a single person;

To provide a trailer structure as described that will be attractively designed, with the boat when supported merging into the streamlined contour of the trailer so as to offer minimum resistance to wind; and To provide a conventional structure as stated which will meet the requirements of highway laws of various states, in view of the fact that the supported boat does not obstruct visibility of the driver, or of other drivers upon the road, in any way.

Other objects will appear from the following description, the claims appended thereto, and from the annexed drawing, in which like reference characters designate like parts throughout the several views, and wherein:

Figure 5 is a front elevational view of the structure with the boat loaded thereon;

Figure 6 is a rear elevational view of the structure with the boat loaded thereon;

Figure 7 is an enlarged, detail section on line 7—7 of Figure 4; and

Figure 8 is an enlarged, detail section on line 8—8 of Figure 6.

Figure 1:
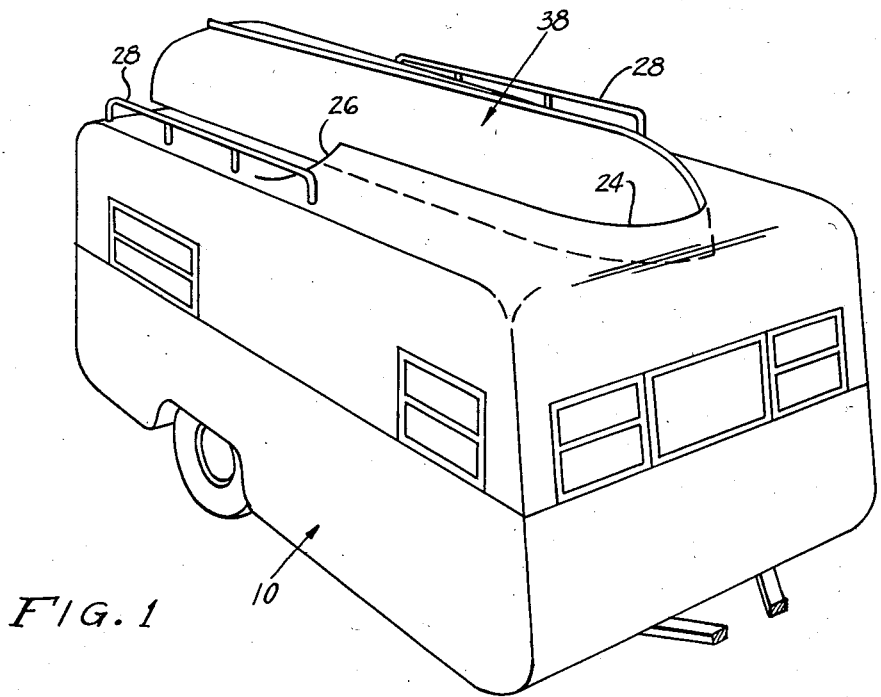
Figure 1 is a perspective view of a combination house trailer and boat trailer formed in accordance with the present invention, as seen from the front.

Referring to the drawings in detail, the reference numeral 10 generally designates the combination house trailer and boat trailer formed according to the present invention. The outer configuration and general overall design of the house trailer may be varied as desired, and of course the same holds true for its size and interior finishing. The trailer includes a roof structure of double-walled formation, including an outer shell 12 and an inner shell 14 spaced from the outer shell as shown in Figures 7 and 8. The outer and inner shells merge into outer and inner side walls 16, 18, at each side of the house trailer, and further merge, at the rear of the trailer, into outer and inner rear walls 20, 21 respectively.

The outer top wall 12 is formed, at a location spaced forwardly from the rear end of the trailer (see Figures 3 and 7) with a shallow recess 22, said recess being closed at its front end. The recess 22, for a portion of its length, has parallel, substantially straight side walls, although the straight, parallel relation of the side walls of the recess can be varied, if desired, to permit the recess to more closely fit the associated boat. Thus, it is possible to manufacture the particular house trailer and the particular boat to be carried thereby, as a combination unit, in which event the recess would be shaped to exactly complement the configuration of the top portion of the boat.

Figure 3:
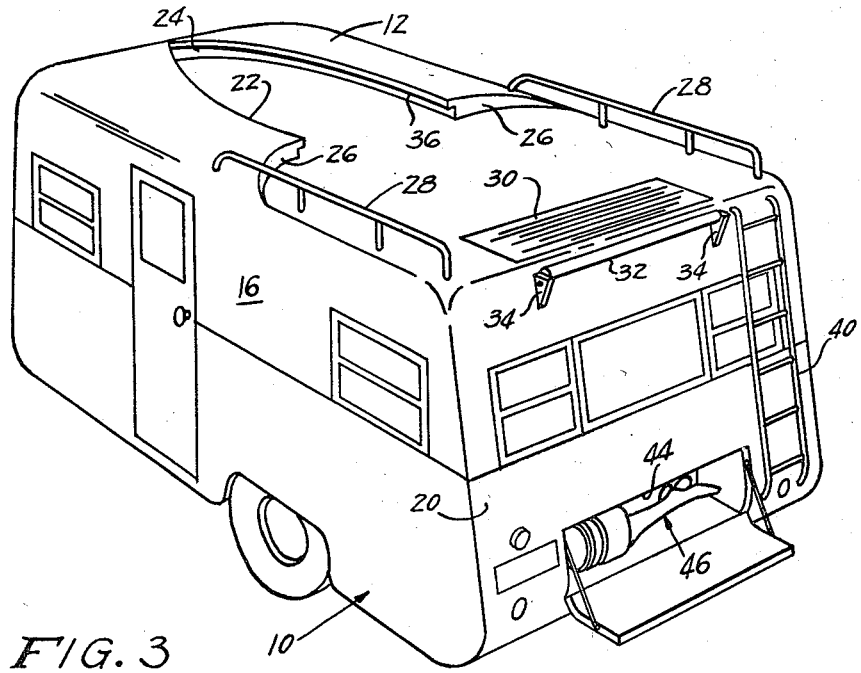
Figure 3 is a rear perspective view with the boat removed and the motor storage compartment open.

In any event, the recess at its forward, closed end, tapers along curving lines as best shown in Figure 3, at 24.

Recess 22, at its open, rear end, opens into a wide, recessed portion 26 of the roof structure, and this recessed portion extends the full width of the roof structure in the preferred embodiment. This permits luggage to be packed upon the roof of the trailer, at opposite sides of the boat carried thereby. To permit the loading of the luggage, there are provided luggage guard rails or racks 28, extending along opposite sides of the trailer within the wide recess 26, to provide side walls on said wide recess 26 disposed adjacent the respective side walls of the trailer body.

When the luggage is loaded upon the trailer, the rails 28 will prevent the luggage from shifting laterally in a direction outwardly off the sides of the trailer. Meanwhile, the boat, when loaded, in effect defines inner walls on the side luggage racks defined in the recess 26 at opposite sides of the boat, cooperating with the rails 28 in limiting lateral shifting of the luggage.

Adjacent the rear end of the roof, there is cemented to the roof, or otherwise fixedly secured thereto, a wide rubber pad 30, providing protection both for the roof and for the boat, during unloading and loading operations.

At the juncture between the rear end of the roof and the upper end of the rear wall of the trailer, there is provided a roller 32, mounted upon brackets 34 carried by the rear end wall of the trailer body. The roller 32 is spaced outwardly from the roof and rear end wall a short distance, as shown in Figure 8, with the top portion of the roller being substantially coplanar with the top surface of the roof.

Secured to the wall of the recess 22, and extending along the top of said wall, is a rubber beading 36, providing a resilient overhang. When a boat 38 is extended into the recess 22, the sides of the boat may engage against said overhang, and are resiliently cushioned thereby against damage during the motion of the vehicle, which damage might otherwise be incurred due to road shocks. Further, the boat is provided with an outwardly flanged portion 39, and since this is disposed under the overhang, any tendency of the boat to bounce upwardly out of the recess 22 is prevented by engagement of the portion 39 against the edging or beading 36.

Figure 2:
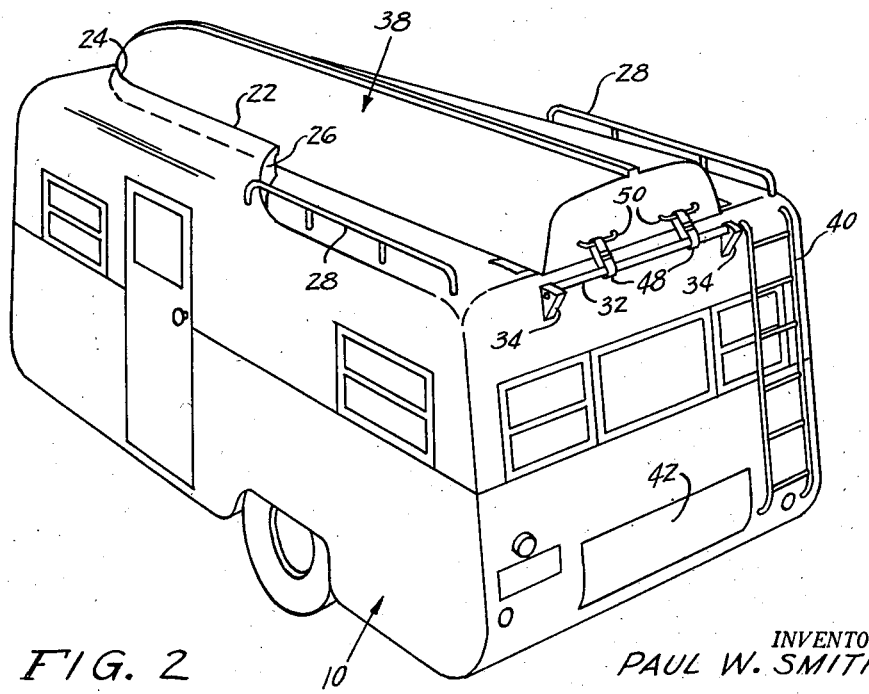
Figure 2 is a rear perspective view thereof.
Figure 4:
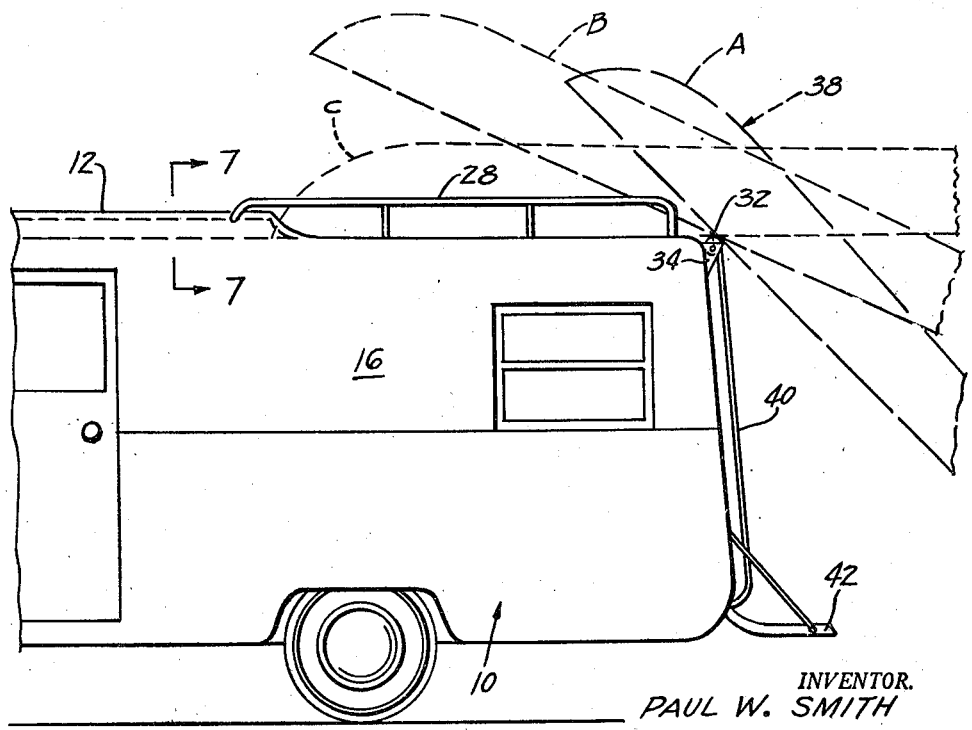
Figure 4 is a fragmentary side elevational view of the structure, the dotted lines showing the boat in different positions during the movement thereof into position atop the structure.

The bow portion of the boat, as shown in Figures 1 and 2, fits snugly within the recess 22, and in loading the boat upon the trailer, one disposes the boat first in the position A in Figure 4. The boat rides up on the roller 32, and is tilted to the position B, ultimately coming to rest in the position C as it moves forwardly upon the roof. The boat is now slid forwardly, to engage the bow portion thereof in the recess 22, and as previously noted, the boat will be locked within said recess through the provision of the overhang, and the boat-complementing shape of the recess.

At one side of the trailer, there is provided a ladder 40 upon the rear wall, which can be used not only to facilitate loading and unloading of the boat, but also can be used for the purpose of facilitating the loading and unloading of luggage, not shown.

In the preferred, illustrated embodiment, there is also provided a motor storage compartment 44, opening within the rear end wall of the trailer, adjacent the lower end of said wall. A door 42 hinged upon the rear end wall normally closes the compartment 44, and an outboard motor 46 can be readily loaded into the compartment.

The construction is particularly adapted for use by fishermen, campers, hunters, and boat enthusiasts. The house trailer and the boat, as previously noted, may be manufactured as a combination unit, with the boat being formed of light weight aluminum or the like in a preferred embodiment. In this way, the hunters or other persons using the trailer and boat can move from place to place with minimum difficulty, with the boat being readily loaded and unloaded for use at the various stopping points.

It is desirable, when the boat is loaded, that it be held firmly in place, and to this end (see Figure 2) straps 48 are extended about the roller 42, said straps extending through laterally spaced keepers 50 projecting rearwardly from the boat transom. The straps are equipped with buckles or other means to facilitate their detachment from the boat and from the roller whenever desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A combination house trailer and boat trailer comprising a hollow trailer body including a roof the top surface of which is formed with a shallow, upwardly opening recess, having a floor below the level of said top surface for supporting a boat on the roof in position at least partially recessed in the top surface, the recess having a closed forward end terminating rearwardly from the forward end of the roof, said recess having an open rear end for movement of a boat into and out of the recess, the recess being formed, at least at the fore part thereof, to a configuration when viewed in plan approximating that of the bow of a boat also seen in plan, for snug engagement of the bow of the supported boat within said fore part of the recess, the walls of the recess including overhangs for lockably engaging the bow of the supported boat within the fore part of the recess.

2. A combination house trailer and boat trailer comprising a hollow trailer body including a roof the top surface of which is formed with a shallow, upwardly opening recess, having a floor below the level of said top surface for supporting a boat on the roof in position at least partially recessed in the top surface, the recess having a closed forward end terminating rearwardly from the forward end of the roof, said recess having an open rear end for movement of a boat into and out of the recess, the recess being formed, at least at the fore part thereof, to a configuration when viewed in plan approximating that of the bow of a boat also seen in plan, for snug engagement of the bow of the supported boat within said fore part of the recess, said fore part of the recess being tapered over the full length of the fore part, with the fore part of the recess being widest at its rear end, said fore part of the recess being progressively decreased in width toward its forward extremity and merging, at the wider end of the fore part, into a recessed portion of the roof extending over the full width of the roof fully to the rear end thereof.

References Cited in the file of this patent

UNITED STATES PATENTS

| | | |
|---|---|---|
| 1,309,251 | Lakin | July 8, 1919 |
| 2,310,431 | Hart | Feb. 9, 1943 |
| 2,520,698 | Sniezyk | Aug. 29, 1950 |
| 2,536,189 | Kuns | Jan. 2, 1951 |
| 2,598,458 | Somers | May 27, 1952 |

FOREIGN PATENTS

| | | |
|---|---|---|
| 432,200 | Italy | July 2, 1947 |